US011696167B2

(12) United States Patent
Young et al.

(10) Patent No.: US 11,696,167 B2
(45) Date of Patent: Jul. 4, 2023

(54) SYSTEMS AND METHODS TO AUTOMATE SLICE ADMISSION CONTROL

(71) Applicant: Verizon Patent and Licensing Inc., Basking Ridge, NJ (US)

(72) Inventors: Kristen Sydney Young, Morris Plains, NJ (US); Viswanath Kumar Skand Priya, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 273 days.

(21) Appl. No.: 17/073,011

(22) Filed: Oct. 16, 2020

(65) Prior Publication Data

US 2022/0124547 A1   Apr. 21, 2022

(51) Int. Cl.
*H04W 28/02* (2009.01)
*H04W 72/52* (2023.01)

(52) U.S. Cl.
CPC ....... *H04W 28/0247* (2013.01); *H04W 72/52* (2023.01)

(58) Field of Classification Search
None
See application file for complete search history.

(56) References Cited

U.S. PATENT DOCUMENTS

2018/0317133 A1* 11/2018 Sciancalepore ....... H04W 16/02
2020/0154292 A1*  5/2020 Bor-Yaliniz ........ H04L 41/0894
2022/0201601 A1*  6/2022 Cai ........................ H04W 8/18

FOREIGN PATENT DOCUMENTS

WO   WO20160695121   *  6/2016

OTHER PUBLICATIONS

ONAP Platform Architecture. The Linux Foundation Projects (2018). Accessed online on Oct. 16, 2020 https://www.onap.org/architecture. 3 pages.
3GPP TS 23.501 V16.3.0 (Dec. 2019). 3rd Generation Partnership Project; Technical Specification Group Services and System Aspects; System architecture for the 5G System (5GS); Stage 2 (Release 16). 417 pages.

* cited by examiner

*Primary Examiner* — Mohammad S Adhami

(57) ABSTRACT

A device may include a processor configured to receive a request to admit a network slice, associated with at least one requirement, in a wireless communication network. The processor may be further configured to determine a resources, associated with the wireless communication network, needed to implement the network slice; compute an estimated resource load for the network slice; compute a projected resource load for the determined resources; and determine that the resources have sufficient capacity to meet the at least one requirement associated with the network slice based on the computed estimated resource load and the projected resource load for the resources. The processor may admit the network slice to be deployed in the wireless communication network, in response to determining that the resources have sufficient capacity to meet the at least one requirement associated with the network slice.

20 Claims, 8 Drawing Sheets

350

| NETWORK FUNCTION ID |
| 510 |
| NETWORK FUNCTION TYPE |
| 520 |
| DEPLOYMENT |
| 530 |
| CLOUD RESOURCES |
| 540 |
| RAN RESOURCES |
| 550 |
| CAPACITY |
| 560 |
| CURRENT LOAD |
| 570 |
| PROJECTED FUTURE LOAD |
| 580 |

| LINK ID |
| 610 |
| ENDPOINTS |
| 620 |
| DEPLOYMENT |
| 630 |
| TRANSPORT RESOURCES |
| 640 |
| CAPACITY |
| 650 |
| CURRENT LOAD |
| 660 |
| PROJECTED FUTURE LOAD |
| 670 |

SYSTEMS AND METHODS TO AUTOMATE SLICE ADMISSION CONTROL

BACKGROUND INFORMATION

To satisfy the needs and demands of users of mobile communication devices, providers of wireless communication services continue to improve and expand available services as well as networks used to deliver such services. One aspect of such improvements includes the virtualization of the components of wireless communications networks. A wireless communications network may provide different types of services to a large number of devices under various types of conditions. Managing virtualized components to service a large number of different services or handle a large number of different conditions poses various challenges.

BRIEF DESCRIPTION OF THE DRAWINGS

FIG. 5 illustrates exemplary components of the network function database of FIG. 3 according to an implementation described herein;

FIG. 6 illustrates exemplary components of the virtual link database of FIG. 3 according to an implementation described herein;

DETAILED DESCRIPTION OF PREFERRED EMBODIMENTS

Figure 1:
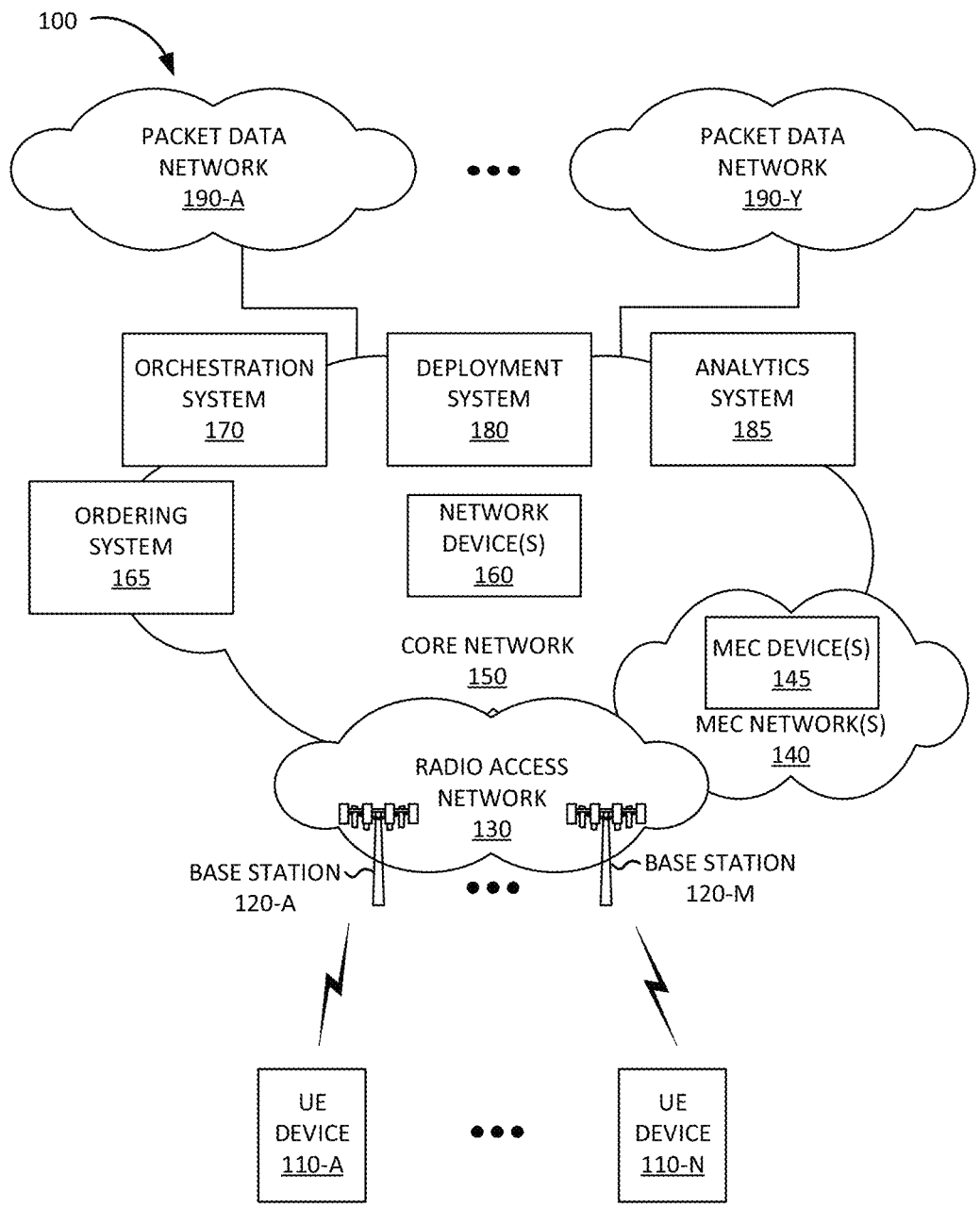
FIG. 1 illustrates an environment according to an implementation described herein.

The following detailed description refers to the accompanying drawings. The same reference numbers in different drawings identify the same or similar elements.

As communication networks and services increase in size, complexity, and number of users, management of the communication networks has become increasingly more complex. One way in which wireless networks are continuing to become more complicated is by incorporating various aspects of next generation networks, such as $5^{th}$ generation (5G) mobile networks, utilizing high frequency bands (e.g., 24 Gigahertz, 39 GHz, etc.), and/or lower frequency bands such as Sub 6 GHz, and a large number of antennas. 5G New Radio (NR) radio access technology (RAT) may provide significant improvements in higher bandwidth and/or lower latency over other wireless network technology. Additionally, a 5G core network supports and manages 5G radio access networks (RAN) that include base stations, providing various services and enabling connections to other networks (e.g., connections to the Internet, etc.). As an example, a 5G core network may provide support for enhanced Mobile Broadband (eMBB), ultra reliable low latency communication (URLLC), massive Machine Type Communication (mMTC), and/or other types of communications.

Such different types of services may be implemented using network slicing. Network slicing is a form of virtual network architecture that enables multiple logical networks to be implemented on top of a common shared physical infrastructure using software defined networking (SDN) and/or network function virtualization (NFV). Each logical network, referred to as a "network slice," may encompass an end-to-end virtual network with dedicated storage and/or computation resources, may be configured to implement a different set of requirements and/or priorities, and/or may be associated with a particular Class of Service (CoS) class, and/or particular enterprise customer associated with a set of user equipment (UE) devices.

In order to implement functionality such as, for example, network slicing, a 5G core network may include various network nodes, known as network functions (NFs). As the number of different NF types and deployed instances of each NF continues to increase, the use of virtualized NFs (VNFs) has become more prevalent. VNF representations of network devices and/or nodes may be implemented using, for example, a European Telecommunications Standards Institute (ETSI) network function virtualization (NFV) management and organization (MANO) architecture and may be referred to as VNF managed objects (VNF MOs). VNF MOs may be deployed, for example, on hardware in a cloud computing center. In contrast to specialized hardware, which may be costly, time-consuming to deploy, difficult to scale, and/or labor-intensive to manage, NFV may enable network entities to be implemented on standardized hardware, resulting in lower deployment and/or maintenance costs, as well as bring higher flexibility compared to dedicated hardware implementations. For example, a VNF may be implemented on a hardware component that is part of a common shared physical infrastructure used to implement VNF instances using Software Defined Networking (SDN) or another type of virtualization technique. The common shared physical infrastructure may be implemented using computer devices in a cloud computing center, a multi-access edge computing (MEC) system associated with a base station, and/or in another type of computer system.

In some implementations, VNFs may be deployed using virtual machines. Virtual machines are generated on a physical architecture using a virtual machine monitor, also referred to as a hypervisor. Each virtual machine runs its own instance of an operating system (OS), libraries, binary executable files, etc. In other implementations, VNFs may be deployed using container-based virtualization, which enables multiple isolated user space instances to use the same OS instance and/or kernel space. The isolated user space instances are referred to as containers. A container may have its own set of libraries and binary executable files, and/or its own dedicated share of hardware resources, but may share a kernel space with other containers. Since containers are decoupled from the underlying infrastructure, containers may be portable across cloud center and OS distributions. Furthermore, the functions of an NF may be divided into microservices implemented in different containers. An NF deployed using containers may be referred to as a Cloud-Native Function (CNF).

A provider of wireless communication services may manage a set of different infrastructures and each infrastructure may host VNFs, as well as virtual links between VNFs, to implement a set of network slices. For example, an eMBB infrastructure may host VNFs to implement a network slice for voice communication using an Internet Protocol (IP) Multimedia Subsystem (IMS) and a network slice for video streaming. A low latency communication (LLC) infrastructure may host VNFs to implement a Vehicle-to-Everything (V2X) network slice and a mission critical (MC) LLC network slice. Each network slice may be associated with a different set of requirements, such as performance requirements, capacity requirements, security requirements, etc.

As the number of network slices in a wireless communication network increases, managing the network slices may become complex and consume a large amount of resources. For example, when a new network slice is to be admitted to the wireless communication network, a determination may need to be made as to whether the network can meet service level agreements (SLAs) associated with the new network slice. Thus, automating network slice admission control in an orchestration framework for a wireless communication network may be a requirement to efficiently meet SLAs, assure performance, and enable on-demand rapid service offering and deployment of network slices.

Implementations described herein relate to systems and methods for automated slice admission control. An orchestration system may receive a request to admit a network slice in a wireless communication network. The orchestration system may determine requirements associated with the network slice, such as, for example, a performance requirement, a capacity requirement, and/or a security requirement, and select an infrastructure on which to deploy the network slice, such as, for example, an eMBB infrastructure, an LLC infrastructure, an ultra-low latency communication (U-LLC) infrastructure, etc.

The orchestration system may determine NFs, and virtual links between the NFs, which are needed to implement the network slice and then determine resources associated with the NFs and virtual links, including resources used by an NF and/or resources controlled by an NF. The resources may include cloud resources, transport resources, and/or radio access network (RAN) resources. The orchestration system may compute an estimated resource load for the network slice design and compute a projected resource load for the determined resources. Determining the projected resource load may include determining a current load for the resources based on a set of metrics associated with the resources and computing an estimated future load for resources based on a historical load associated with the resources.

The orchestration system may then determine whether the resources have sufficient capacity to meet the requirements associated with the network slice based on the estimated resource load for the network slice, the projected resource load for the determined resources, and the admission criteria associated with the selected infrastructure. If the orchestration system determines that the resources have sufficient capacity to meet the requirements associated with the network slice, the orchestration system may admit the network slice to be deployed in the wireless communication network and the network slice may be deployed on the selected infrastructure. If the orchestration system determines that the resources do not have sufficient capacity to meet the requirements associated with the network slice, the orchestration system may generate a message indicating the network slice cannot be admitted. Additionally, or alternatively, the orchestration system may select a different infrastructure and repeat the admission process using the different infrastructure.

FIG. 1 is a diagram of an exemplary environment 100 in which the systems and/or methods, described herein, may be implemented. As shown in FIG. 1, environment 100 may include UE devices 110-A to 110-N (referred to herein collectively as "UE devices 110" and individually as "UE device 110"), radio access network (RAN) 130 that includes base stations 120-A to 120-X (referred to herein collectively as "base stations 120" and individually as "base station 120"), MEC network(s) 140 that include MEC device(s) 145, core network 150 that includes network device(s) 160, an ordering system 165, an orchestration system 170, a deployment system 180, and an analytics system 185, and packet data networks (PDNs) 190-A to 190-Y (referred to herein collectively as "PDNs 190" and individually as "PDN 190").

UE device 110 may include any device with cellular wireless communication functionality. For example, UE device 110 may include a handheld wireless communication device (e.g., a mobile phone, a smart phone, a tablet device, etc.); a wearable computer device (e.g., a head-mounted display computer device, a head-mounted camera device, a wristwatch computer device, etc.); a laptop computer, a tablet computer, or another type of portable computer; a desktop computer; a customer premises equipment (CPE) device, such as a set-top box or a digital media player (e.g., Apple TV, Google Chromecast, Amazon Fire TV, etc.), a WiFi access point, a smart television, etc.; a portable gaming system; a global positioning system (GPS) device; a home appliance device; a home monitoring device; and/or any other type of computer device with wireless communication capabilities and a user interface. UE device 110 may include capabilities for voice communication, mobile broadband services (e.g., video streaming, real-time gaming, premium Internet access etc.), best effort data traffic, and/or other types of applications.

In some implementations, UE device 110 may communicate using machine-to-machine (M2M) communication, such as MTC, and/or another type of M2M communication for Internet of Things (IoT) applications. For example, UE device 110 may include a health monitoring device (e.g., a blood pressure monitoring device, a blood glucose monitoring device, etc.), an asset tracking device (e.g., a system monitoring the geographic location of a fleet of vehicles, etc.), a traffic management device (e.g., a traffic light, traffic camera, road sensor, road illumination light, etc.), a climate controlling device (e.g., a thermostat, a ventilation system, etc.), a device controlling an electronic sign (e.g., an electronic billboard, etc.), a device controlling a manufacturing system (e.g., a robot arm, an assembly line, etc.), a device controlling a security system (e.g., a camera, a motion sensor, a window sensor, etc.), a device controlling a power system (e.g., a smart grid monitoring device, a utility meter, a fault diagnostics device, etc.), a device controlling a financial transaction system (e.g., a point-of-sale terminal, an automated teller machine, a vending machine, a parking meter, etc.), and/or another type of electronic device.

Base station 120 may include a 5G NR base station (e.g., a gNodeB) and/or a Fourth Generation (4G) Long Term Evolution (LTE) base station (e.g., an eNodeB). Each base station 120 may include devices and/or components configured to enable cellular wireless communication with UE devices 110. For example, base station 120 may include a radio frequency (RF) transceiver configured to communicate with UE devices using a 5G NR air interface using a 5G NR protocol stack, a 4G LTE air interface using a 4G LTE protocol stack, and/or using another type of cellular air interface. Base station 120 may enable communication with core network 150 to enable core network 150 to authenticate UE device 110 with a subscriber management device (e.g., Home Subscriber Server (HSS) in 4G, Unified Data Management (UDM) in 5G, etc.).

RAN 130 may enable UE devices 110 to connect to core network 150 via base stations 120 using cellular wireless signals. For example, RAN 130 may include one or more central units (CUs) and distributed units (DUs) (not shown in FIG. 1) that enable and manage connections from base stations 120 to core network 150. RAN 130 may include features associated with an LTE Advanced (LTE-A) network and/or a 5G core network or other advanced network, such as management of 5G NR base stations; carrier aggregation; advanced or massive multiple-input and multiple-output (MIMO) configurations (e.g., an 8×8 antenna configuration, a 16×16 antenna configuration, a 256×256 antenna configuration, etc.); cooperative MIMO (CO-MIMO); relay stations; Heterogeneous Networks (HetNets) of overlapping small cells and macrocells; Self-Organizing Network (SON) functionality; MTC functionality, such as 1.4 Megahertz (MHz) wide enhanced MTC (eMTC) channels (also referred to as category Cat-M1), Low Power Wide Area (LPWA) technology such as Narrow Band (NB) IoT (NB-IoT) technology, and/or other types of MTC technology; and/or other types of LTE-A and/or 5G functionality.

Each MEC network 140 may be associated with one or more base stations 120 and may provide MEC services for UE devices 110 attached to the one or more base stations 120. MEC network 140 may be in proximity to the one or more base stations 120 from a geographic and network topology perspective, thus enabling low latency communication with UE devices 110 and/or base stations 120. As an example, MEC network 140 may be located on a same site as one of the one or more base stations 120. As another example, MEC network 140 may be geographically closer to the one or more base stations 120, and reachable via fewer network hops and/or fewer switches, than other base stations 120 and/or packet data networks 190. As yet another example, MEC network 140 may be reached without having to go through a gateway device, such as a 4G Packet Data Network Gateway (PGW) or a 5G User Plane Function (UPF).

MEC network 140 may include one or more MEC devices 145. MEC devices 145 may provide MEC services to UE devices 110, such as, for example, content delivery of streaming audio and/or video, cloud computing services, authentication services, etc. In some implementations, MEC devices 145 may host deployed VNFs used to implement particular network slices. Thus, MEC devices 145 may form part of an infrastructure for hosting network slices. For example, an LLC infrastructure may enable VNFs to be implemented in a first MEC network 140 that includes MEC devices 145 accessible via a PGW or UPF connection, while a U-LLC infrastructure may enable VNFs to be implemented in a second MEC network 140 that includes MEC devices 145 accessible without having to establish a connection via a PGW or UPF, by enabling a direct connection from base station 120 to MEC device 145.

Core network 150 may be managed by a provider of cellular wireless communication services and may manage communication sessions of subscribers connecting to core network 150 via RAN 130. For example, core network 150 may establish an Internet Protocol (IP) connection between UE devices 110 and PDN 190. In some implementations, core network 150 may include a 5G core network. A 5G core network may include devices that implement network functions that include an Access and Mobility Function (AMF) to perform registration management, connection management, reachability management, mobility management, and/or lawful intercepts; a Session Management Function (SMF) to perform session management, session modification, session release, IP allocation and management, Dynamic Host Configuration Protocol (DHCP) functions, and selection and control of a UPF; a UPF to serve as a gateway to packet data network 190, act as an anchor point, perform packet inspection, routing, and forwarding, perform Class of Service (CoS) handling in the user plane, uplink traffic verification, transport level packet marking, downlink packet buffering, and/or other type of user plane functions; an Application Function (AF) to provide services associated with a particular application; a Unified Data Management (UDM) to manage subscription information, handle user identification and authentication, and perform access authorization; a Policy Control Function (PCF) to support policies to control network behavior, provide policy rules to control plane functions, access subscription information relevant to policy decisions, and perform policy decisions; a Charging Function (CHF) to perform charging and billing functions; a Network Repository Function (NRF) to support service discovery, registration of network function instances, and maintain profiles of available network function instances; a Network Exposure Function (NEF) to expose capabilities and events to other network functions, including third party network functions; a Network Slice Selection Function (NSSF) to select a network slice instance to serve a particular UE device 110; a Network Data Analytics Function (NWDAF) to collect analytics information, such as, for example, a set of Key Performance Indicator (KPI) values associated with RAN 130 and/or core network 150; and/or other types of network functions.

In other implementations, core network 150 may include a 4G LTE core network (e.g., an evolved packet core (EPC) network). An EPC network may include devices that implement network functions that include a Mobility Management Entity (MME) for control plane processing, authentication, mobility management, tracking and paging, and activating and deactivating bearers; a Serving Gateway (SGW) that provides an access point to and from UE devices, acts as a local anchor point during handovers, and directs gateway to a PDN gateway (PGW); a PGW that functions as a gateway to a particular PDN 190; a Policy and Charging Rules Function (PCRF) that implements policy and charging rules functions, such as establishment of Quality of Service (QoS) requirements, setting allowed bandwidth and/or data throughput limits for particular bearers, and/or other policies; and a Home Subscriber Server (HSS) that stores subscription information for UE devices, including subscription profiles that include authentication and access authorization information, group device memberships, subscription privileges, and/or other types of subscription information.

Core network 150 may include network device(s) 160. Network device 160 may include a 4G network node; a 5G NF; a transport network device, such as, for example, a switch, router, firewall, gateway, an optical switching device (e.g., a reconfigurable optical add-drop multiplexer, etc.), and/or another type of network device. Network device 160 may include a physical function node or a VNF. Thus, the components of core network 150 may be implemented as dedicated hardware components and/or as VNFs implemented on top of a common shared physical infrastructure using Software Defined Networking (SDN). For example, an SDN controller (e.g., in deployment system 180) may implement one or more of the components of core network 150 using an adapter implementing a VNF virtual machine, a Cloud-Native Network Function (CNF) container, an event driven serverless architecture interface, and/or another type of SDN architecture. The common shared physical infrastructure may be implemented using one or more devices 200 described below with reference to FIG. 2 in a cloud computing center associated with core network 150. Additionally, or alternatively, some, or all, of the common shared physical infrastructure may be implemented using one or more devices 200 included in MEC device 145. Sets of network devices 160 and/or MEC devices 145 may be organized into different infrastructures. As an example, an eMBB infrastructure may include network devices 160 that function as gateway devices (e.g., UPFs, PGWs, etc.) to packet data networks 190 a low latency infrastructure may include VNFs implemented in MEC devices 145, etc.

Ordering system 165 may include one or more computer devices, such as server devices, to process orders for network slices. For example, a customer, such as a business, organization, and/or government entity may request a service for which a new network slice is to be deployed. As an example, a business may request a communication service associated with a QoS and may request data traffic separation for the service, resulting in ordering system 165 sending a request, to admit a new network slice in core network 150 and/or RAN 130, to orchestration system 170.

Orchestration system 170 may include one or more computer devices, such as server devices, to orchestrate network slices in core network 150 and/or RAN 130. For example, orchestration system 170 may determine whether a particular network slice should be admitted and deployed on a particular infrastructure. Orchestration system 170 may admit a network slice based on requirements associated with the network slice, based on an estimated load associated with the network slice, and/or based on a projected load for resources required to implement the network slice. Orchestration system 170 may obtain current and/or projected load for resources required to implement the slice from analytics system 185. Furthermore, in some implementations, orchestration system 170 may determine whether a VNF instance in core network 150 is to be created, deleted, and/or modified, whether a new type of VNF instance needs to be added to core network 150. Orchestration system 170 may send instructions to deployment system 180 to deploy VNFs and/or to deploy network slices on particular VNFs.

Deployment system 180 may include one or more computer devices, such as server devices, to deploy VNFs in core network 150 and/or RAN 130, and/or to configure the deployed VNFs to implement network slices, based on instructions received from orchestration system 170. For example, deployment system 180 may include a container orchestration platform to configure and automate VNF deployment, scaling, and/or management. For example, the container orchestration platform may deploy a VNF as a set of microservices, with each microservice deployed in a different container, may deploy additional instances of an VNF based on increased load, and/or may manage the deployed instances across different physical devices, referred to as nodes. Furthermore, deployment system 180 may manage communication between different microservices using a service mesh. The container orchestration platform may organize containers into groups called pods and the service mesh may deploy a service proxy in the same pod as a microservice container to enable the microservice to communicate with other microservices.

Analytics system 185 may include one or more computer devices, such as server devices, to collect KPI metrics associated with VNFs and/or virtual links between VNFs in core network 150 and/or RAN 130. For example, analytics system 185 may include an NWDAF and/or may obtain KPI values obtained by an NWDAF for VNFs in core network 150. Furthermore, analytics system 185 may obtained KPI values from base stations 120 and or transport network devices such as routers, switches, etc. The collected KPI values may be used by analytics system 185 to determine current load values for resources associated with core network 150 and/or RAN 130. Furthermore, analytics system 185 may compute a projected future load for resources associated with core network 150 and/or RAN 130 based on historical load values associated with the resources. For example, analytics system 185 may include a machine learning model trained to estimate future loads based on historical values associated with particular resources.

PDNs 190-A to 190-N may each include a packet data network. A particular PDN 190 may be associated with an Access Point Name (APN) and UE device 110 may request a connection to the particular packet data network 190 using the APN. PDN 190 may include, and/or be connected to and enable communication with, a local area network (LAN), a wide area network (WAN), a metropolitan area network (MAN), an autonomous system (AS) on the Internet, an optical network, a cable television network, a satellite network, a wireless network (e.g., a CDMA network, a general packet radio service (GPRS) network, and/or an LTE network), an ad hoc network, a telephone network (e.g., the Public Switched Telephone Network (PSTN) or a cellular network), an intranet, or a combination of networks.

Although FIG. 1 shows exemplary components of environment 100, in other implementations, environment 100 may include fewer components, different components, differently arranged components, or additional components than depicted in FIG. 1. Additionally, or alternatively, one or more components of environment 100 may perform functions described as being performed by one or more other components of environment 100. For example, while ordering system 165, orchestration system 170, deployment system 180, and analytics system 185 are shown as separate systems in FIG. 1, in other implementations, orchestration system 170 may include and/or be combined with any of ordering system 165, deployment system 180, and/or analytics system 185.

Figure 2:
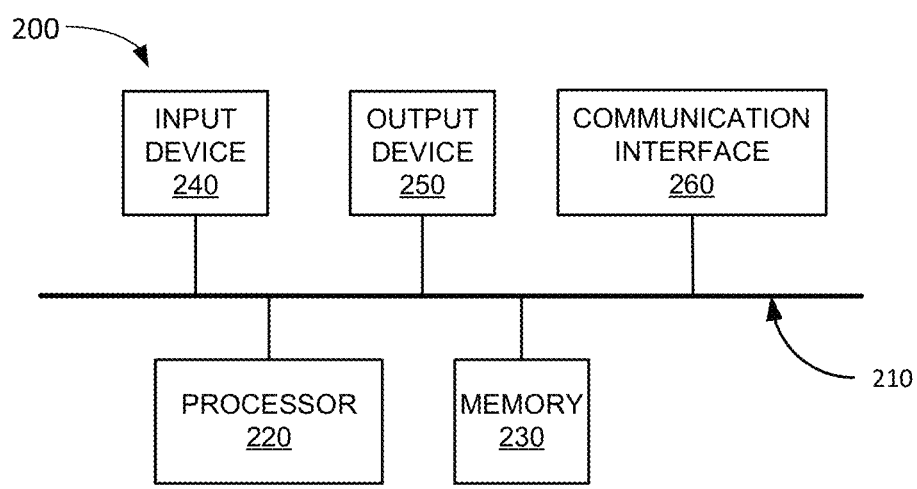
FIG. 2 illustrates exemplary components of device that may be included in the components of FIG. 1 according to an implementation described herein.

FIG. 2 is a diagram illustrating example components of a device 200 according to an implementation described herein. UE device 110, base station 120, MEC device 145, network device 160, ordering system 165, orchestration system 170, deployment system 180, and/or analytics system 185 may each include, or be implemented on, one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, central processing unit (CPU), graphics processing unit (GPU), tensor processing unit (TPU), hardware accelerator, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some implementations, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the user. In some implementations, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to automated network slice admission control. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
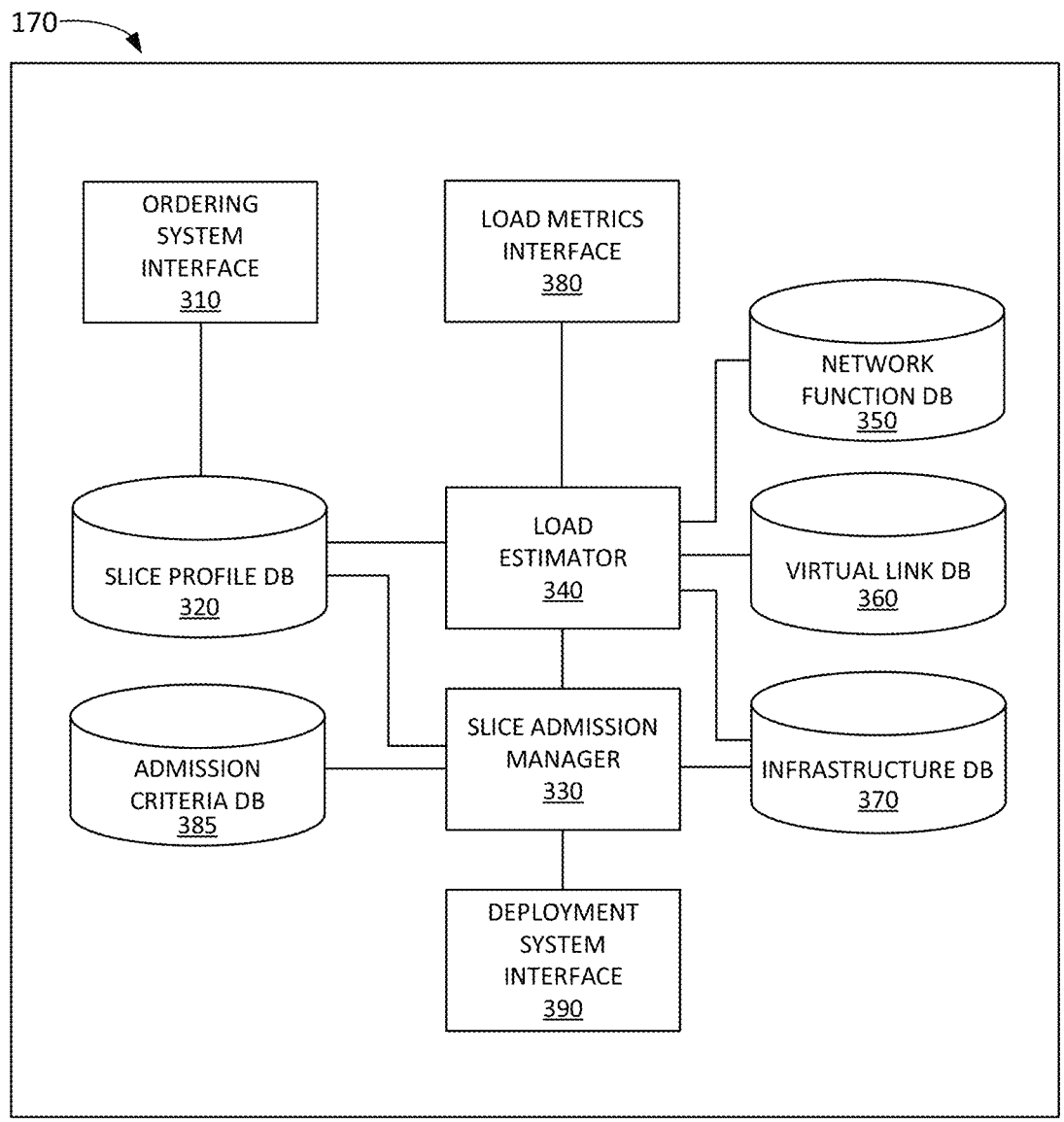
FIG. 3 illustrates exemplary components of the orchestration system of FIG. 1 according to an implementation described herein.

FIG. 3 is a diagram illustrating exemplary components of orchestration system 180. The components of orchestration system 180 may be implemented, for example, via processor 220 executing instructions from memory 230. Alternatively, some or all of the components of orchestration system 180 may be implemented via hard-wired circuitry. As shown in FIG. 3, orchestration system 180 may include an ordering system interface 310, a slice profile database (DB) 320, a slice admission manager 330, a load estimator 340, a network function database (DB) 350, a virtual link DB 360, an infrastructure DB 370, a load metrics interface 380, an admission criteria DB 385, and a deployment system interface 390.

Ordering system interface 310 may be configured to communicate with ordering system 165. For example, ordering system interface 310 may receive a request to admit a new network slice and may store information relating to the new network slice in slice profile DB 320. The network slice request may include information identifying one or more requirements associated with the network slice. Exemplary information that may be stored in slice profile DB 320 is described below with reference to FIG. 4.

Slice admission manager 330 may select a particular infrastructure for the new network slice based on the one or more requirements associated with the network slice and based on information stored in infrastructure DB 370. Infrastructure DB 370 may store information relating to particular infrastructures associated with core network 150 and/or RAN 130. For each infrastructure, infrastructure DB 370 may store information identifying a geographic area associated with the infrastructure, a type of service associated with the infrastructure, a performance assurance associated with the infrastructure (e.g., a latency assurance, a reliability assurance, etc.), a capacity associated with the infrastructure, a security level associated with the infrastructure, and/or other types of information that may be used by slice admission manager 330 to select a particular infrastructure on which to deploy a network slice. Furthermore, infrastructure DB 370 may identify a set of VNFs and/or virtual links between VNFs associated with the infrastructure.

Slice admission manager 330 may identify resources required to implement the network slice on the selected infrastructure. For example, slice admission manager 330 may identify an AMF, SMF, UPF, PCF, UDM, and/or other types of VNFs required to enable the network slice to enable communication between UE devices 110, between UE device 110 and packet data network 190, between UE device 110 and MEC network 140, and/or to establish other types of Protocol Data Unit (PDU) connections using the selected infrastructure. Furthermore, slice admission manager 330 may identify the virtual links between the selected VNFs. Slice admission manager 330 may then instruct load estimator 340 to determine an estimated load for the new network slice and a projected resource load for the identified resources required to implement the network slice.

Load estimator 340 may determine an estimated load for a network slice based on a capacity requirement associated with the network slice. The capacity requirement may specify a UE device density for a geographic area, a number of UE sessions during a particular time period, an uplink and/or downlink throughput per UE device session, and/or another types of capacity requirement. Load estimator 340 may convert the capacity requirement into an estimated load for the network slice with respect to cloud resources, transport resources, and/or RAN resources. Load estimator 340 may determine an average load, and/or a maximum load for the cloud resources, transport resources, and/or RAN resources that may be consumed by the network slice.

As an example, for the RAN resources, load estimator 340 may compute an average and/or maximum number of UE device connections per base station sector for the network slice, an average and/or maximum carrier bandwidth for the network slice, an estimated carrier spectral efficiency for the network slice, and/or other types of RAN resource loads. As another example, for transport resources, load estimator 340 may compute an average and/or maximum number of carriers being aggregated onto a circuit for the network slice, an average and/or maximum number of connections per switch or router for the network slice, and/or other types of transport resource loads. As yet another example, for cloud resources, load estimator 340 may compute the average and/or maximum processor and memory loads per session for the network slice, a total average and/or maximum processor and memory load for the network slice, and/or other types of cloud resource loads.

Furthermore, load estimator 340 may determine a projected resource load for the resources required to implement the network slice based on already existing network slices. The projected resource load may be based on a current load and/or a projected future load for the resource required to implement the network slice. Load estimator 340 may determine the current load for the VNFs and/or virtual links between the VNFs identified by slice admission manager 330 for implementing the network slice. As an example, for RAN resources controlled by a VNF, load estimator 340 may determine a number of UE device sessions associated with the RAN resources, a throughput associated with the RAN resources, a spectral efficiency associated with the RAN resources, and/or other KPI values indicative of a resource load. As another example, for cloud resources used by a NF, load estimator 340 may determine processor and/or memory resources being used by the VNF. As yet another example, for a virtual link between two VNFs, load estimator 340 may determine the transport resources being consumed by the virtual link, such as a number of connection being handled by the virtual link, the throughput associated with the virtual link, the processing resources of a router or switch being consumed by the virtual link, and/or other transport network KPI values indicative of a resource load.

Load estimator 340 may obtain the KPI values for the current loads for the VNFs and/or virtual links from load metrics interface 380 and store the information in network function DB 350 and/or virtual link DB 360. Load metrics interface 380 may be configured to obtain the KPI values from analytics engine 190, from a particular NF, such as an NWDAF, from a service mesh configured to collect the KPI values via a service proxy container, and/or directly from particular VNF. Additionally, load metrics interface 380 may obtain projected future KPI values for loads for the VNFs and/or virtual links from analytics system 185. Alternatively, load estimator 340 may compute the projected future KPI values using a trained machine learning model based on historical load values associated with the VNFs and/or virtual links and stored in network function DB 350 and/or virtual link DB 360. Exemplary information that may be stored in network function DB 350 is described below with reference to FIG. 5. Exemplary information that may be stored in virtual link DB 360 is described below with reference to FIG. 6.

Slice admission manager 330 may then determine whether to admit the network slice based on the determined estimated resource load for the network slice and the projected resource load for the resources required to implement the network slice. Slice admission manager 330 may determine a total resource load for the resources by adding the estimated resource load for the network slice and the projected resource load for the resources, compare the total resource load to the total capacity of the resources, and determine whether comparison satisfies one or more admission criteria stored in admission criteria DB 385.

Admission criteria DB 385 may store admission criteria for particular infrastructures, particular classes of service, particular geographic areas, particular types of resources, etc. For example, an admission criterion may specify that a particular VNF associated with a particular infrastructure may need to maintain a particular percentage of total capacity available to handle temporary spikes in the load. If admitting a network slice would result in the particular VNF having a smaller reserve capacity than specified by the admission criterion, the network slice may not be admitted. Thus, slice admission manager 330 may determine whether admitting the network slice would result in an acceptable available capacity for the resources required to implement the network slice and may admit the network slice if the admission criteria are satisfied. If the admission criteria are not satisfied, slice admission manager 330 may generate a message indicating the network slice cannot be admitted and may send the error message to ordering system 165. In some implementations, slice admission manager 330 may select a different, less preferred infrastructure and attempt to admit the network slice on the less preferred infrastructure. For example, slice admission manager 330 may select a regional infrastructure associated with a different geographic area, an infrastructure associated with a different performance and/or capacity requirement, etc.

Deployment system interface 390 may be configured to communicate with deployment system 180. For example, deployment system interface 390 may instruct deployment system 180 to deploy a network slice after slice admission manager 330 selects to admit the network slice.

Although FIG. 3 shows exemplary components of orchestration system 180, in other implementations, orchestration system 180 may include fewer components, different components, additional components, or differently arranged components than depicted in FIG. 3. Additionally, or alternatively, one or more components of orchestration system 180 may perform one or more tasks described as being performed by one or more other components of orchestration system 180.

Figure 4:
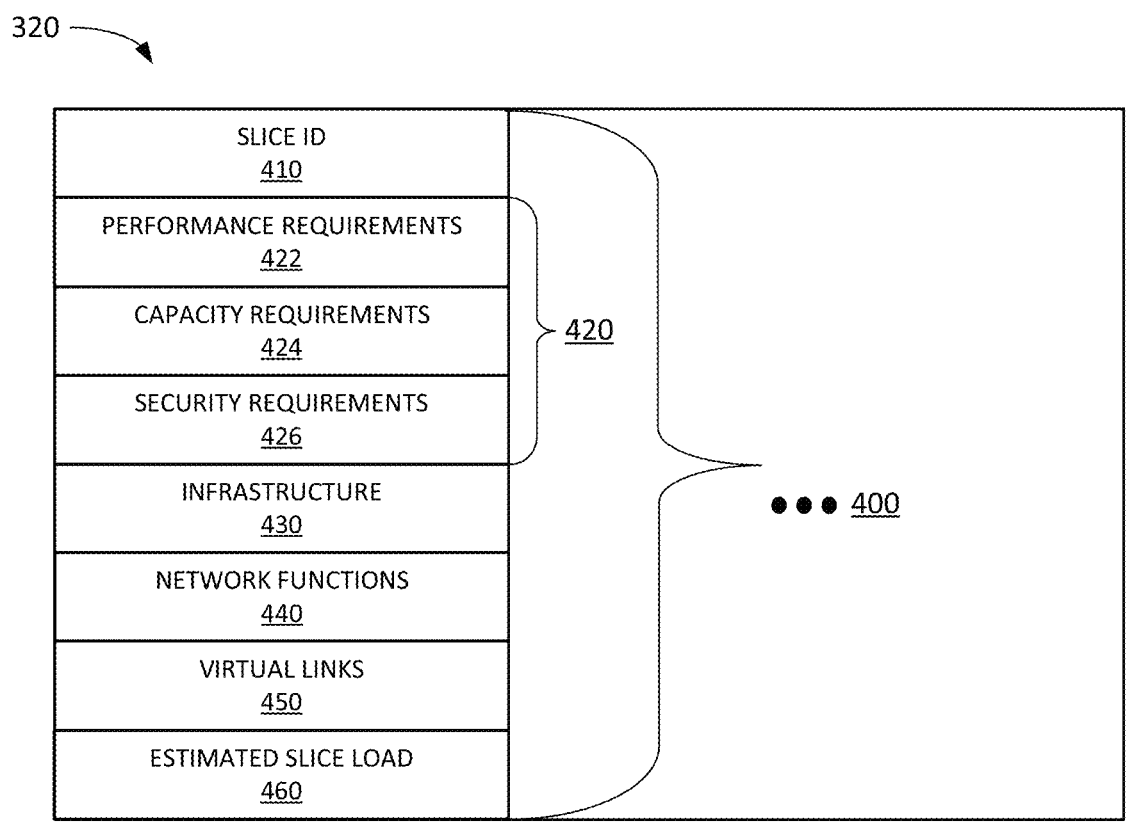
FIG. 4 illustrates exemplary components of the slice profile database of FIG. 3 according to an implementation described herein.

FIG. 4 illustrates exemplary components of slice profile DB 320. As shown in FIG. 4, slice profile DB 320 may include one or more slice profile records 400. Each slice profile record 400 may store information associated with a particular network slice. Slice profile record 400 may include a slice identifier (ID) field 410, requirements fields 420, infrastructure field 430, network functions field 440, virtual links field 450, and an estimated slice load field 460.

Slice ID field 410 may include a slice identifier associated with a network slice for which an admission determination is to be made. For example, slice ID field 410 may include a Network Slice Selection Assistance Information (NSSAI) value, a Slice/Service Type (SST) value, a Slice Differentiation (SD) value, and/or another type network slice identification value.

Requirements fields 420 may store one or more requirements associated with the network slice. For example, requirements fields 420 may include a performance requirements field 422, a capacity requirements field 424, and/or a security requirements field 426. Performance requirements field 422 may store information identifying one or more performance requirements associated with the network slice, such as, for example, a latency requirement, a CoS requirement, a reliability requirement, an availability requirement, a signal coverage requirement, a protocol support requirement, and/or another type of performance requirement. Capacity requirements field 424 may store information identifying one or more capacity requirements associated with the network slice, such as, for example, a number of UE device sessions requirement, a throughput per UE device session requirement, a total throughput requirement, and/or another type of capacity requirement. Security requirements field 426 may store information identifying one or more security requirements associated with the network slice, such as, for example, an encryption requirement, a requirement to support a particular security protocol, an authentication and/or authorization requirement, a requirement to support protection from a particular security attack, and/or another type of security requirement.

Infrastructure field 430 may store information identifying an infrastructure selected for the network slice by slice admission manager 330. Network functions field 440 may store information identifying NFs required to implement the network slice. Virtual links field 450 may store information identifying virtual links required to implement the network slice. Estimated slice load field 460 may store an estimated slice load computed for the network slice by load estimator 340.

Although FIG. 4 shows exemplary components of slice profile DB 320, in other implementations, slice profile DB 320 may include fewer components, different components, additional components, or differently arranged components than depicted in FIG. 4.

FIG. 5 illustrates exemplary components of network function DB 350. As shown in FIG. 5, network function DB 350 may include one or more network function records 500. Each network function record 500 may store information associated with a particular network function. Network function record 500 may include a network function ID field 510, a network function type field 520, a deployment field 530, a cloud resources field 540, a RAN resources field 550, a capacity field 560, a current load field 570, and a projected future load field 580.

Network function ID field 510 may store information identifying a particular NF, such as, for example, a unique ID assigned to the particular NF, an IP address associated with the particular NF, and/or another type of ID. Network function type field 520 may store information identifying a type of NF associated with the particular NF. For example, network function type field 520 may identify whether the particular NF corresponds to a DU, a CU, an AMF, an SMF, a UPF, a UDM, a PCF, a CHF, an NEF, an NRF, an NSSF, an NWDAF, and/or another type of NF.

Deployment field 530 may store information identifying deployment information associated with the particular NF. For example, deployment field 530 may identify a particular device or node on which the particular NF is deployed. Cloud resources field 540 may store information identifying the cloud resources associated with the particular NF. For example, cloud resources field 540 may identify one or more processor and/or memory devices associated with the particular NF. RAN resources field 550 may store information identifying RAN resources controlled by the particular NF. For example, RAN resources field 550 may identify one or more base station sectors (e.g., RF transceivers) associated with the particular NF, one or more bands and/or channels associated with the particular NF, physical resource blocks (PRBs) associated with the particular NF, a dedicated radio bearers associated with the particular NF, signaling bearers associated with the particular NF, and/or other types of RAN resources controlled by the particular NF.

Capacity field 560 may store a capacity associated with the particular NF. For example, capacity field 560 may store information identifying a cloud resource capacity associated with the particular NF and/or a RAN resource capacity for RAN resources controlled by the particular NF. Current load field 570 may store information identifying a current load associated with the particular NF, such as information identifying a percentage of the cloud resources capacity and/or a percentage of the RAN resources capacity associated with the particular NF; information identifying a particular KPI value, such as, for example, a processor load value, a memory usage value, a throughput value (e.g., downlink average throughput, downlink maximum throughput, uplink average throughput, uplink maximum throughput, etc.), a bandwidth value, a number of sessions value, a number of PRBs value, a number of dedicated radio bearers, a number of signal bearers, etc.; and/or other types of load information. Projected future load field 580 may store information identifying a projected future load for the particular NF for an upcoming time period.

Although FIG. 5 shows exemplary components of network function DB 350, in other implementations, network function DB 350 may include fewer components, different components, additional components, or differently arranged components than depicted in FIG. 5.

FIG. 6 illustrates exemplary components of virtual link DB 360. As shown in FIG. 6, virtual link DB 360 may include one or more virtual link records 600. Each virtual link record 600 may store information associated with a particular network function. Virtual link record 600 may include a link ID field 610, an endpoints field 620, a deployment field 630, a transport resources field 640, a capacity field 650, a current load field 660, and a projected future load field 670.

Link ID field 610 may store an ID associated with a particular virtual link. Endpoints field 620 may identify the endpoints between the virtual link, such as first NF and a second NF associated with NF records 500 in NF DB 350. Deployment field 630 may store information identifying deployment information associated with the particular virtual link, such as the deployment information associated with the endpoints. Transport resources field 640 may store information identifying transport resources associated with the virtual link, such as, for example, a transport network circuit and/or one or more transport network devices (e.g., routers, switches, ROADMs, etc.), and/or other types of transport network resources.

Capacity field 650 may store a capacity associated with the virtual link. For example, capacity field 650 may store information identifying a transport network resource capacity associated with the virtual link, such as throughput capacity of a circuit associated with the virtual link, a switching capacity associated with a switch, a routing capacity associated with a router, etc. Current load field 660 may store information identifying a current load associated with the virtual link, such as information identifying a percentage of the transport resources capacity; information identifying a particular KPI value, such as, for example, a throughput value (e.g., downlink average throughput, downlink maximum throughput, uplink average throughput, uplink maximum throughput, etc.), a packet delivery rate value, a packet loss rate value, a packet delay rate value, a connection request value (e.g., a connection request count, a connection request duration, a connection response time, etc.), and/or other types of values indicative of a transport load. Projected future load field 670 may store information identifying a projected future load for the virtual link for an upcoming time period.

Although FIG. 6 shows exemplary components of virtual link DB 360, in other implementations, virtual link DB 360 may include fewer components, different components, additional components, or differently arranged components than depicted in FIG. 6.

Figure 7:
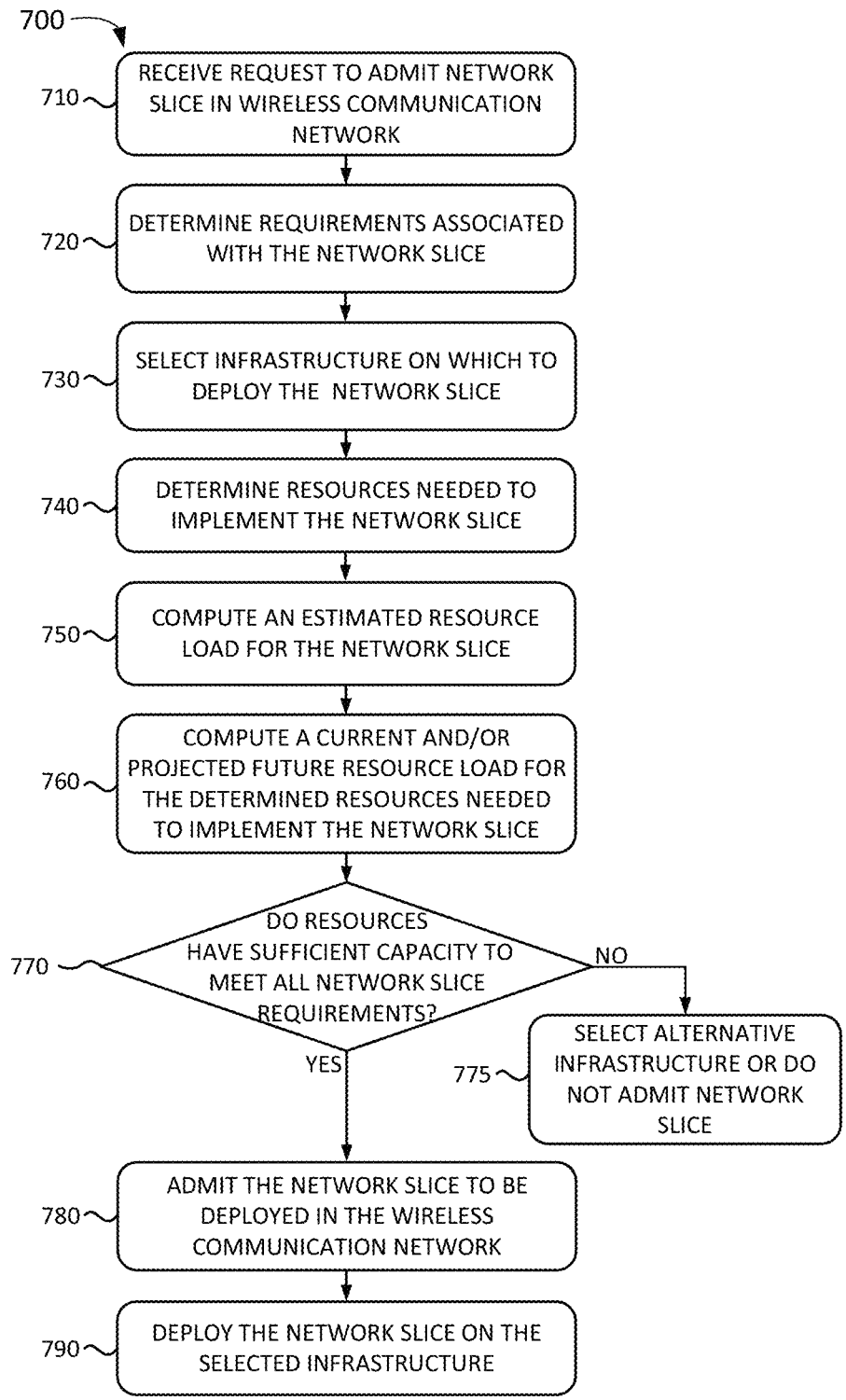
FIG. 7 illustrates a flowchart of a process for network slice admission according to an implementation described herein.

FIG. 7 illustrates a flowchart of a process for network slice admission according to an implementation described herein. In some implementations, process 700 of FIG. 7 may be performed by orchestration system 170. In other implementations, some or all of process 700 may be performed by another device or a group of devices separate from orchestration system 170.

As shown in FIG. 7, process 700 may include receiving a request to admit a network slice in a wireless communication network (block 710). For example, orchestration system 170 may receive a request to admit a new network slice and may store information relating to the new network slice in slice profile DB 320. The network slice request may include information identifying one or more requirements associated with the network slice. Process 700 may further include determining requirements associated with the network slice (block 720), selecting an infrastructure on which to deploy the network slice (block 730), and determining resources needed to implement the network slice (block 740). For example, orchestration system 170 may select a particular infrastructure for the new network slice based on the requirements associated with the network slice and based on information stored in infrastructure DB 370 and then identify a set of VNFs and/or virtual links between VNFs associated with the infrastructure.

Process 700 may further include computing an estimated resource load for the network slice (block 750) and computing a current and/or projected future resource load for the determined resources needed to implement the network slice (block 760). For example, orchestration system 170 may determine an estimated load for a network slice based on a capacity requirement associated with the network slice, such as, for example, a UE device density for a geographic area, a number of UE sessions during a particular time period, an uplink and/or downlink throughput per UE device session, and/or another types of capacity requirement. Orchestration system 170 may convert the capacity requirement into an estimated load for the network slice with respect to cloud resources, transport resources, and/or RAN resources.

Furthermore, orchestration system 170 may determine a projected resource load for the resources required to implement the network slice based on already existing network slices. The projected resource load may be based on a current load and/or a projected future load for the resource required to implement the network slice. Orchestration system 170 may determine a load for RAN resources controlled by the identified VNFs, such as, for example, a throughput value, bandwidth value, a number of PRBs value, a number of dedicated bearers value, a number of signal bearers value, and/or another type of metrics value indicative of a RAN resources load; determine a load for cloud resources used by the identified VNFs, such as, for example, a processor load value, a memory usage value, and/or another type of metrics value indicative of a cloud resources load; and determine a load for transport resources used by the identified virtual links, such as, for example, a throughput value, a packet delivery rate value, a packet loss rate value, a packet delay rate value, a connection request value, and/or other types of values indicative of a transport load. Additionally, orchestration system 170 may determine projected future load values to determine whether the load values may change more than a threshold in an upcoming time period and may use the projected future load values if the load values are determined to be likely to change more than a threshold in the upcoming time period.

A determination may be made as to whether the resources have sufficient capacity to meet all the network slice requirements (block 770). For example, orchestration system 170 may add up the estimated resource load for the network slice and the projected resource load to determine an estimated total load on the resources required to implement the network slice and compare the estimated total load to slice admission criteria stored in admission criteria DB 385. The slice admission criteria for the selected infrastructure may specify, for example, a maximum allowed load as a percentage of the total capacity for the resources associated with the selected infrastructure.

If it is determined that the resources do not have sufficient capacity to meet all the network slice requirements (block 770—NO), an alternative infrastructure may be selected or the network slice may not be admitted to the wireless communication network (block 775). In some implementations, orchestration system 170 may select a different infrastructure and attempt to admit the network slice on the different infrastructure (e.g., by repeating the process of FIG. 7). If a different infrastructure is not available, or if all available infrastructures have been selected and determined to be unable to meet all the network slice requirements, the network slice may not be admitted to the wireless communication network. For example, orchestration system 170 may send a message to ordering system 165, indicating that the network slice could not be admitted.

If it is determined that the resources have sufficient capacity to meet the network slice requirements (block 770—YES), the network slice may not be admitted to be deployed in the wireless communication network (block 780) and the network slice may be deployed on the selected infrastructure (block 790). For example, orchestration system 170 may send an instruction to deployment system 180 to deploy the network slice using the identified resources.

Figure 8:
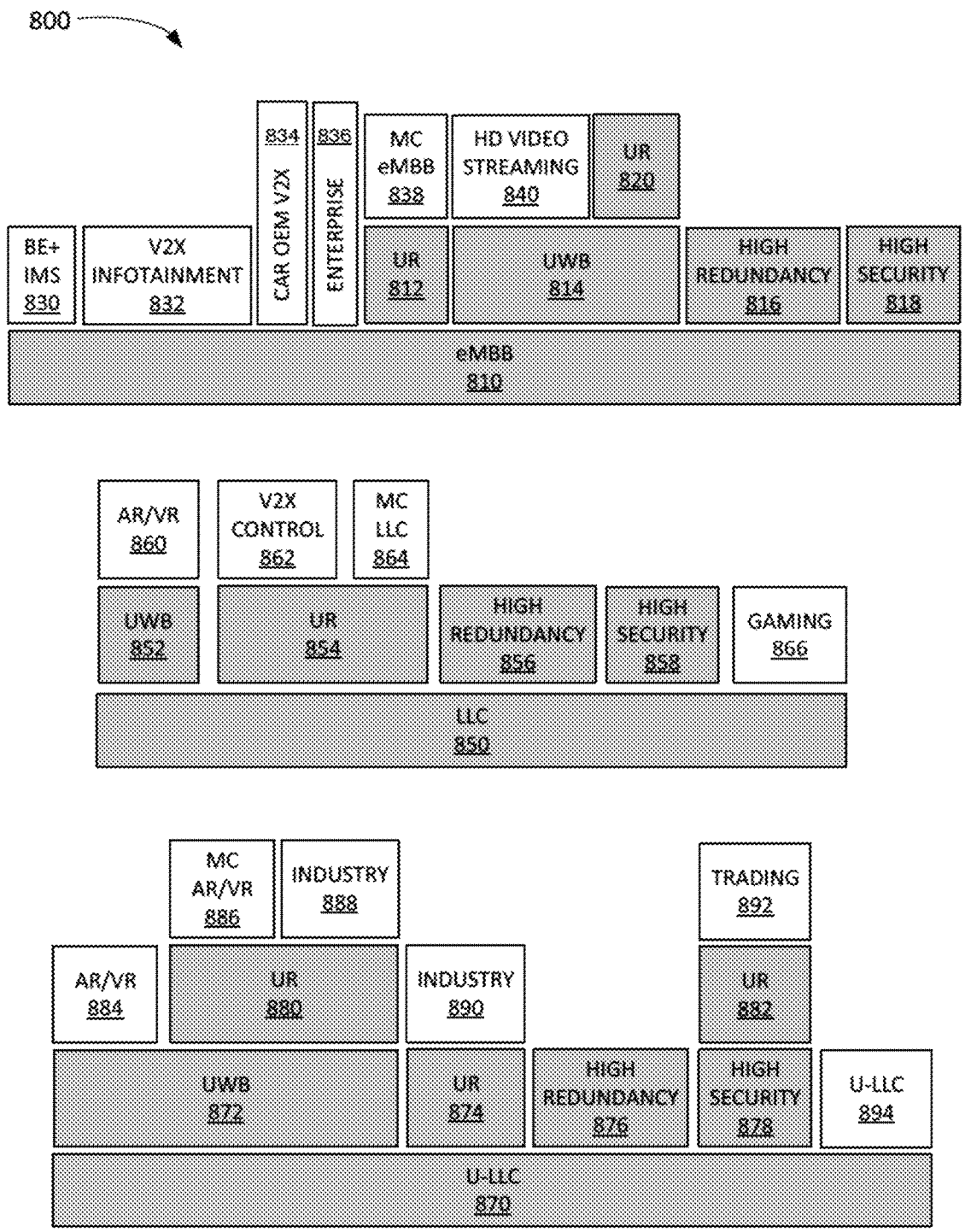
FIG. 8 illustrates an exemplary set of network infrastructures and network slices according to an implementation described herein.

FIG. 8 illustrates an exemplary set 800 of network infrastructures and network slices implemented in core network 150 and/or RAN 130 according to an implementation described herein. As shown in FIG. 8, infrastructure set 800 may include an eMBB infrastructure 810, an LLC infrastructure 850, and a U-LLC infrastructure 870. eMBB infrastructure 810 may include base stations 120, transport network devices, and cloud center devices hosting NFs for providing eMBB services. Additional infrastructures may be deployed on top of eMBB infrastructure 810, such as an ultra-reliable (UR) infrastructure 812, an ultra-wideband (UWB) infrastructure 814, a high redundancy infrastructure 816, and a high security infrastructure 818. Furthermore, an additional UR infrastructure 820 may be deployed on top of UWB infrastructure 814. UR infrastructure 812 may guarantee ultra-reliable PDU delivery rate (e.g., about a 99.999% packet delivery rate, about a 99.999% connection availability, etc.). UWB infrastructure 814 may enable low energy high-bandwidth communication (e.g., over 500 MHz bandwidth) using time modulation and may provide high data throughput. High redundancy infrastructure 816 may enable connections with a high redundancy. High security infrastructure 818 may enable high security connections. UWB infrastructure 820 may enable UR UWB connections.

eMBB infrastructure 810 may include multiple implemented network slices. For example, eMBB infrastructure 810 may include a best effort (BE) and IMS network slice 830, a V2X infotainment network slice 832, an automotive original equipment manufacturer (OEM) V2X network slice 834, an enterprise network slice 836, a mission critical (MC) eMBB network slice 838, and a high density (HD) video streaming network slice 840. BE and IMS network slice 830 may enable BE and/or IMS data traffic. V2X infotainment network slice 832 may enable infotainment service to passengers in vehicles. OEM V2X network slice 834 may enable V2X communication for OEMs of vehicles. Enterprise network slice 836 may enable UE devices 110 to establish private connections to a packet data network 190 associated with an enterprise. MC eMBB network slice 838 may be implemented on UR infrastructure 812 and enable MC eMBB service (e.g., used by a medical application installed on UE devices 110 of medical staff at a hospital, etc.). HD video streaming network slice 840 may be implemented on UWB infrastructure 814 and enable HD video streaming.

LLC infrastructure 850 may include base stations 120, transport network devices, and cloud center devices hosting NFs for providing LLC services (e.g., communication with a latency less than 5 milliseconds (ms)). Additional infrastructures may be deployed on top of LLC infrastructure 850, such as a UWB infrastructure 852, a UR infrastructure 854, a high redundancy infrastructure 856, and a high security infrastructure 858. UWB infrastructure 852, UR infrastructure 854, high redundancy infrastructure 856, and high security infrastructure 858 may support functions similar to those described above with respect to eMBB 810.

LLC infrastructure 850 may include multiple implemented network slices. For example, LLC infrastructure 850 may include an augmented reality/virtual reality (AR/VR) network slice 860, a V2X control network slice 862, an MC LLC network slice 864, and a gaming slice 866. AR/VR network slice 860 may be implemented on UR infrastructure 854 and provide an AR/VR service to UE devices 110. V2X control network slice 862 may be implemented on UR infrastructure 854 and provide a V2X control channel that requires low latency messages. MC LLC network slice 864 may be implemented on UR infrastructure 854 and enable MC LLC service (e.g., used by an IoT devices in a manufacturing setting, etc.). Gaming network slice 866 may enable real-time gaming.

U-LLC infrastructure 870 may include base stations 120, transport network devices, and cloud center devices hosting NFs for providing U-LLC services (e.g., communication with a latency less than 1 ms). Additional infrastructures may be deployed on top of U-LLC infrastructure 870, such as a UWB infrastructure 872, a UR infrastructure 874, a high redundancy infrastructure 876, and a high security infrastructure 878, a UR infrastructure 880, and a UR infrastructure 882. UWB infrastructure 872, UR infrastructure 874, high redundancy infrastructure 876, and high security infrastructure 878 may support functions similar to those described above with respect to eMBB infrastructure 810 and LLC infrastructure 850. UR infrastructure 880 may be implemented on top of UWB infrastructure 872 and guarantee ultra-reliable and high throughput connections. UR infrastructure 882 may be implemented on top of high security infrastructure 878 and guarantee ultra-reliable and high security connections.

U-LLC infrastructure 870 may include multiple implemented network slices. For example, U-LLC infrastructure 870 may include an AR/VR network slice 884, an MC AR/VR network slice 886, an industry network slice 888, an industry network slice 890, a trading network slice 892, and a U-LLC network slice 894.

AR/VR network slice 884 may be implemented on UWB infrastructure 872 and provide a high throughput AR/VR service to UE devices 110. MC AR/VR network slice 886 may be implemented on UR infrastructure 880 and enable mission critical, high reliability, and high throughput AR/VR service (e.g., remote surgery, etc.). Industry network slice 888 may be implemented on UR infrastructure 880 and enable mission critical, high reliability, and high throughput communication for a particular industry enterprise (e.g., IoT devices controlling robotic devices using computer vision, etc.). Industry network slice 890 may be implemented on UR infrastructure 874 and enable high reliability communication for a particular industry enterprise. Trading network slice 892 may be implemented on UR infrastructure 882 and enable high speed and high security trading operations. U-LLC network slice 894 may enable U-LLC communication not associated with other requirements.

Figure 9:
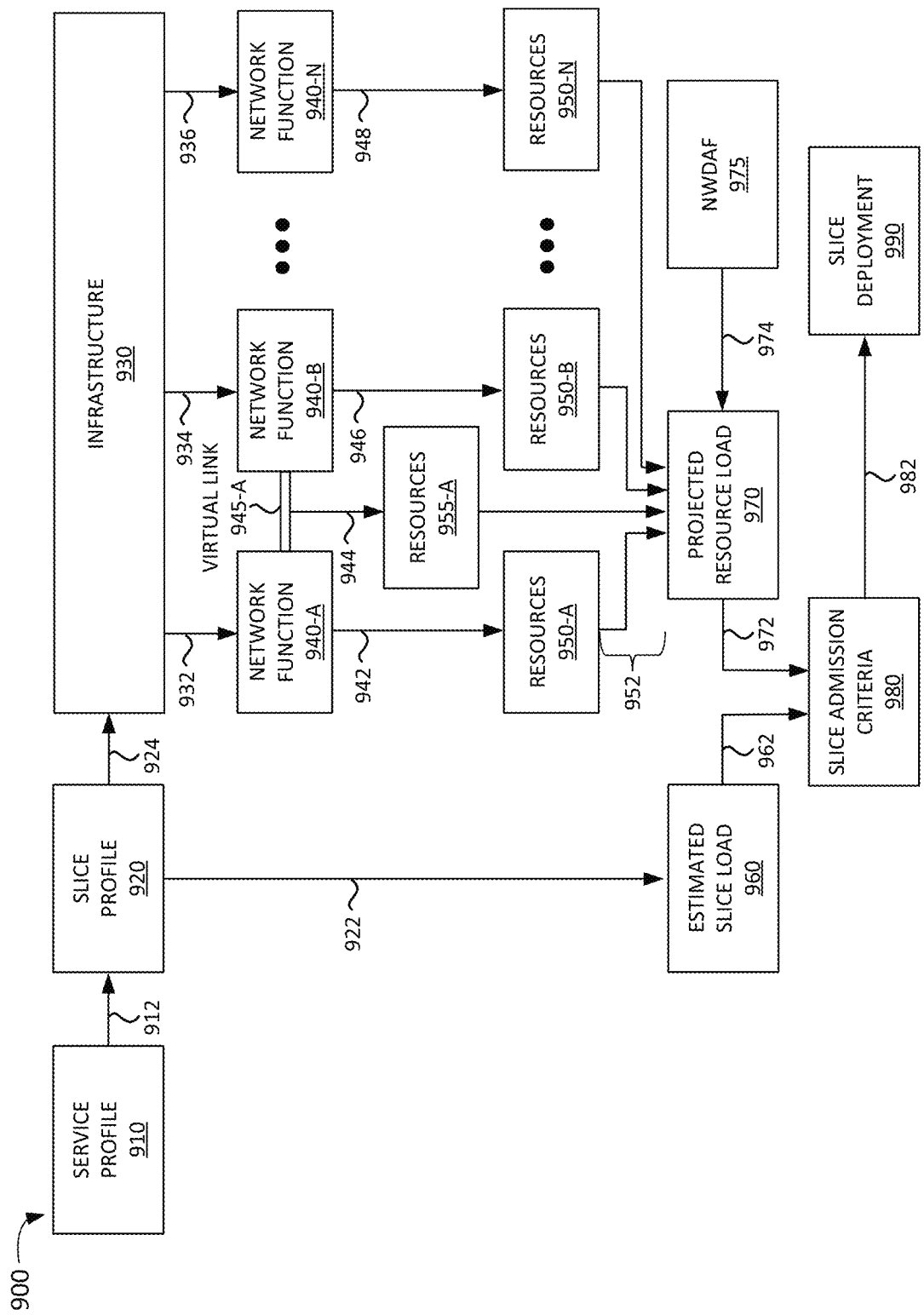
FIG. 9 illustrates an exemplary signal flow diagram according to an implementation described herein.

FIG. 9 illustrates a first exemplary signal flow 900 according to an implementation described herein. For example, assume industry network slice 890 hasn't been admitted yet and ordering system 165 generates a request to admit industry network slice 890. As shown in FIG. 9, signal flow 900 may include using a service profile 910 to generate a slice profile 920 (signal 912). For example, ordering system 165 may generate a slice profile 920 that includes requirements associated with the network slice based on service profile 910. In the case of industry network slice 890, the requirements may include a requirement for ultra-low latency and a requirement for ultra-reliable communication. Additionally, the requirements may include a capacity requirement, such as a throughput requirement, a number of UE sessions per base station sector requirement etc.

Orchestration system 170 may receive slice profile 920 and select an infrastructure 930 based on the requirements associated with slice profile 920 (signal 924). For example, in the case of industry network slice 890, orchestration system 170 may select U-LLC infrastructure 870. Orchestration system 170 may then determine NFs 940-A to 940-N associated with infrastructure 930, and virtual links 945 between NFs 940-A and 940-N, based on information stored in infrastructure DB 370 (signals 932, 934, and 936). Virtual link 945-A between NFs 940-A and 940-B is shown in FIG. 9 for illustrative purposes.

Orchestration system 170 may use the information stored in network function DB 350 and virtual links DB 360 to determine the resources 950-A to 950-N (e.g., cloud resources used by NFs 940 and/or RAN resources controlled by NFs 940) associated with NFs 940 and resources 955 (e.g., transport resources) associated with virtual links 945 (signals 942, 944, 946, and 948). Orchestration system 170 may compute an estimated slice load 960 based on the capacity requirements specified in slice profile 920 (signal 922) and may determine a projected resource load for resources 950 and 955 based on load metrics values collected from resources 950 and 955 by analytics engine 185 and/or obtained directly from resources 950 and 955 (signals 952). Additionally, or alternatively, current and/or projected loads for resources 950 and 955 may be obtained from another device, such a Network Data Analytics Function (NWDAF) 975 in core network 150 (signal 974).

Thus, projected resource load for resources 950 and 955 may represent a percentage of the total capacity of resources 950 and 955 being used by existing network slices on infrastructure 930.

Orchestration system 170 may then compare estimated slice load 960 and projected resource load 970 with the total capacity of resources 950 and 955 and slice admission criteria 980 stored in admission criteria DB 385 (signals 962 and 972). For example, the slice admission criteria may specify that each NF 940 in infrastructure 930 is to maintain a reserve capacity that is a particular percentage of the total capacity. Thus, if estimated slice load 960 and projected resource load 970 are estimated to result in a reserve capacity for resources 950 and 955 that satisfies the admission criterion, industry network slice 890 may be admitted and deployed, resulting in slice deployment 990 of industry network slice 890 by deployment system 180 (signal 982).

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks have been described with respect to FIG. 7, and a series of signals have been described with respect to FIG. 9, the order of the blocks, and/or signals, may be modified in other implementations. Further, non-dependent blocks and/or signals may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/ "comprising" when used in this specification are taken to specify the presence of stated features, integers, steps or components but does not preclude the presence or addition of one or more other features, integers, steps, components or groups thereof.

The term "logic," as used herein, may refer to a combination of one or more processors configured to execute instructions stored in one or more memory devices, may refer to hardwired circuitry, and/or may refer to a combination thereof. Furthermore, a logic may be included in a single device or may be distributed across multiple, and possibly remote, devices.

For the purposes of describing and defining the present invention, it is additionally noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

To the extent the aforementioned embodiments collect, store, or employ personal information of individuals, it should be understood that such information shall be collected, stored, and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
   receiving a request to admit a network slice in a wireless communication network, wherein the network slice is associated with at least one requirement;
   determining a plurality of resources, associated with the wireless communication network, needed to implement the network slice, wherein determining the plurality of resources includes:
   determining a plurality of network functions required to implement the network slice;
   computing an estimated resource load for the network slice, wherein computing the estimated resource load for the network slice further includes:
   determining an estimated resource load for the determined plurality of network functions;
   computing a projected resource load for the determined plurality of resources;
   determining that the plurality of resources has sufficient capacity to meet the at least one requirement associated with the network slice based on the computed estimated resource load and the projected resource load for the determined plurality of resources; and
   admitting the network slice to be deployed in the wireless communication network, in response to determining that the plurality of resources has sufficient capacity to meet the at least one requirement associated with the network slice.

2. The method of claim 1, wherein the at least one requirement includes a performance requirement, a capacity requirement, or a security requirement.

3. The method of claim 1, wherein the plurality of resources needed to implement the network slice include at least one of:

cloud resources;
transport resources; or
radio access network (RAN) resources.

4. The method of claim 3, wherein the transport resources include at least one of a transport network circuit or a transport network device.

5. The method of claim 3, wherein the RAN resources include at least one of a base station sector, a wireless communication band, or a wireless communication channel, a plurality of physical resource blocks (PRBs), a dedicated radio bearer, or a signaling bearer.

6. The method of claim 1, further comprising:
determining a plurality of virtual links between the plurality of network functions for the network slice; and
determining an estimated resource load for particular ones of the plurality of virtual links.

7. The method of claim 1, wherein computing the projected resource load for the determined plurality of resources further includes:
determining a current load for the determined plurality of resources; and
computing an estimated future load for the determined plurality of resources based on a historical load associated with the determined plurality of resources.

8. The method of claim 1, further comprising:
selecting a particular infrastructure, from a plurality of available infrastructures, to deploy the network slice.

9. The method of claim 8, wherein the particular infrastructure includes:
an enhanced mobile broadband infrastructure,
a low latency communication infrastructure, or
an ultra-low latency communication infrastructure.

10. A device comprising:
a processor configured to:
receive a request to admit a network slice in a wireless communication network, wherein the network slice is associated with at least one requirement;
determine a plurality of resources, associated with the wireless communication network, needed to implement the network slice, wherein, when determining the plurality of resources, the processor is further configured to:
determine a plurality of network functions required to implement the network slice;
compute an estimated resource load for the network slice, wherein, when computing the estimated resource load for the network slice, the processor is further configured to:
determine an estimated resource load for the determined plurality of network functions;
compute a projected resource load for the determined plurality of resources;
determine that the plurality of resources has sufficient capacity to meet the at least one requirement associated with the network slice based on the computed estimated resource load and the projected resource load for the determined plurality of resources; and
admit the network slice to be deployed in the wireless communication network, in response to determining that the plurality of resources has sufficient capacity to meet the at least one requirement associated with the network slice.

11. The device of claim 10, wherein the at least one requirement includes a performance requirement, a capacity requirement, or a security requirement.

12. The device of claim 10, wherein the plurality of resources needed to implement the network slice include at least one of:
cloud resources;
transport resources; or
radio access network (RAN) resources.

13. The device of claim 12, wherein the transport resources include at least one of a transport network circuit or a transport network device.

14. The device of claim 12, wherein the RAN resources include at least one of a base station sector, a wireless communication band, or a wireless communication channel, a plurality of physical resource blocks (PRBs), a dedicated radio bearer, or a signaling bearer.

15. The device of claim 10, wherein the processor is further configured to:
determine a plurality of virtual links between the plurality of network functions for the network slice; and
determine an estimated resource load for particular ones of the plurality of virtual links.

16. The device of claim 10, wherein, when computing the projected resource load for the determined plurality of resources, the processor is further configured to:
determine a current load for the determined plurality of resources; and
compute an estimated future load for the determined plurality of resources based on a historical load associated with the determined plurality of resources.

17. The device of claim 10, wherein the processor is further configured to:
select a particular infrastructure, from a plurality of available infrastructures, to deploy the network slice, wherein the particular infrastructure includes an enhanced mobile broadband infrastructure, a low latency communication infrastructure, or an ultra-low latency communication infrastructure.

18. A non-transitory computer-readable memory device storing instructions executable by a processor, the non-transitory computer-readable memory device comprising:
one or more instructions to receive a request to admit a network slice in a wireless communication network, wherein the network slice is associated with at least one requirement;
one or more instructions to determine a plurality of resources, associated with the wireless communication network, needed to implement the network slice, wherein the one or more instructions to determine the plurality of resources further include:
one or more instructions to determine a plurality of network functions required to implement the network slice;
one or more instructions to compute an estimated resource load for the network slice, wherein the one or more instructions to compute the estimated resource load for the network slice further include:
one or more instructions to determine an estimated resource load for the determined plurality of network functions;
one or more instructions to compute a projected resource load for the determined plurality of resources;
one or more instructions to determine that the plurality of resources has sufficient capacity to meet the at least one requirement associated with the network slice based on the computed estimated resource load and the projected resource load for the determined plurality of resources; and one or more instructions to admit the network slice to be deployed in the wireless communication network, in response to determining that the plurality of resources has sufficient capacity to meet the at least one requirement associated with the network slice.

19. The non-transitory computer-readable memory device of claim 18, further comprising:
one or more instructions to select a particular infrastructure, from a plurality of available infrastructures, to deploy the network slice, wherein the particular infrastructure includes an enhanced mobile broadband infrastructure, a low latency communication infrastructure, or an ultra-low latency communication infrastructure.

20. The non-transitory computer-readable memory device of claim 18, further comprising:
one or more instructions to determine a plurality of virtual links between the plurality of network functions for the network slice; and
one or more instructions to determine an estimated resource load for particular ones of the plurality of virtual links.

* * * * *